United States Patent [19]

Meyer et al.

[11] Patent Number: 5,045,591

[45] Date of Patent: Sep. 3, 1991

[54] INTERNAL MOLD RELEASE COMPOSITIONS

[75] Inventors: Louis W. Meyer, Livingston, Tex.; J. Alan Vanderhider, Fruthwilen, Switzerland; Robert Carswell, Lake Jackson, Tex.

[73] Assignee: The Dow Chemical Company, Midland, Mich.

[21] Appl. No.: 425,767

[22] Filed: Oct. 23, 1989

Related U.S. Application Data

[60] Division of Ser. No. 570,141, Jan. 12, 1984, Pat. No. 4,876,019, which is a continuation-in-part of Ser. No. 466,826, Feb. 16, 1983, abandoned.

[51] Int. Cl.⁵ ............................................. C08G 18/30
[52] U.S. Cl. .................................... 524/731; 521/111
[58] Field of Search ......................... 521/111; 524/731

[56] References Cited

U.S. PATENT DOCUMENTS

| | | | |
|---|---|---|---|
| 3,993,606 | 11/1976 | von Bonin | 260/2.5 NH |
| 4,024,090 | 5/1977 | von Bonin | 260/2.5 AH |
| 4,033,912 | 7/1977 | Kleimann | 260/2.5 AH |
| 4,076,695 | 2/1978 | Keil | 260/77.5 AM |
| 4,111,861 | 9/1978 | Godlewski | 521/123 |
| 4,220,727 | 9/1980 | Godlewski | 521/110 |
| 4,396,729 | 8/1983 | Dominquez | 521/110 |
| 4,472,341 | 9/1984 | Alberino | 521/111 |
| 4,728,690 | 3/1988 | Lammerting | 524/731 |
| 4,764,330 | 8/1988 | Stuber | 521/111 |
| 4,764,540 | 8/1988 | Dewhurst | 521/111 |

Primary Examiner—Paul R. Michl
Assistant Examiner—Peter Szekely

[57] ABSTRACT

Internal mold release compositions for use in preparing molded polymeric products are disclosed which contain (a) a primary or secondary amine, (b) a carboxylic acid or amido carboxylic acid salt of a group II metal or of aluminum, lithium, copper, iron, cobalt or nickel, and optionally (c) a carboxylic acid or amido carboxylic acid.

8 Claims, No Drawings

INTERNAL MOLD RELEASE COMPOSITIONS

CROSS-REFERENCE TO RELATED APPLICATIONS

This is a divisional of application Ser. No. 570,141, filed Jan. 12, 1984, now U.S. Pat. No. 4,876,019 incorporated herein by reference, which is a continuation-in-part of application Ser. No. 466,826, filed Feb. 16, 1983 abandoned.

BACKGROUND OF THE INVENTION

The present invention pertains to internal mold release compositions and to polyol compositions containing same and process for preparing polymeric products Polyether polyurethane moldings are being increasingly used in the manufacture of automobiles, furniture and in home construction. Molded polyether polyurethanes are especially important because they are lightweight and are resistant to moisture, weather, temperature extremes, and aging. As an illustration, molded polyether polyurethane elastomers have become of special interest in the manufacture of force-reducing impact media such as safety impact bumpers for automotive vehicles and impact resistant automotive fascia.

The high demand for molded polyether polyurethane articles requires that they be produced in the largest numbers in the shortest possible time. Polyurethane-forming mixtures are eminently suited for mass production because the reactants are liquid, that is they are pumpable, and are quick-reacting. The problem has existed, however, in providing adequate mold release in the shortest possible time to take fullest advantage of the unique capabilities of the polyurethane systems.

Heretofore, release of molded articles from molds in which they have been formed has been achieved by coating the surface of the mold cavity with an agent which facilitates release of the molded article from the walls of the mold cavity. Procedures such as this are described in U.S. Pat. Nos. 3,694,530; 3,640,769; 3,624,190; 3,607,397 and 3,413,390. This method has certain disadvantages. The agent, after molding, adheres to the surface of the molded article thereby removing such from the surface of the mold. As the mold release agent is removed from the mold surface, it must therefore be replaced so as to provide continued release of the molded articles from the mold. The necessity for repeated additions of mold release agent results in higher costs due to low productivity as a result of the additional time incurred in applying such additional quantities of mold release agents to the mold surfaces.

In addition, mold build-up may become a problem, since a fine film of urethane is left in spot areas of the mold surface. This build-up on the surface of the mold cavity walls eventually covers and obscures any detail on the mold cavity surface desired to be imparted to the molded article. Also, the presence of the release agent adhering to the surface of the molded article can impede subsequent operations on the article, such as painting or adhering operations.

Additionally, the need to reapply the release agent after each molding or a limited number of moldings interrupts the molding operation and slows down output.

The use of internal mold release agents for use in molding polyurethane articles has been disclosed by Boden et al. in U.S. Pat. No. 3,726,952, Godlewski in U.S. Pat. No. 4,024,088, Bonin et al. in U.S. Pat. No. 4,098,731, Sparrow et al. in U.S. Pat. No. 4,130,698, Godlewski in U.S. Pat. No. 4,111,861, Kleimann et al. in U.S. Pat. No. 4,201,847 and Godlewski in U.S. Pat. No. 4,220,727.

Some of these internal mold release agents bleed or creep to the surface of the molded article. Some of these articles cannot be painted even after appropriate preparation steps for painting has been done. Others are incompatible with polyether polyols. Most of them seriously reduce the activity of the catalyst. Almost all show degradation of physical properties such as reduced elongation.

The use of the "salts" described in U.S. Pat. No. 3,726,952 have not been effective release agents for reaction injection molding (RIM). While showing release characteristics per se their use has demonstrated in a screening program wherein hand mixed formulations are cast into an open mold other serious problems, namely: (1) degradation of the tin catalyst employed in the formulation, (2) excessively long gel and cure time, and (3) poor physical properties. These problems are believed to be caused by the presence of free carboxylic acid. It is released from the salt by the reaction of the amine with the isocyanate, and it is believed that the presence of these free carboxylic acids, or any acid, interferes with the cure rate of the hydroxylisocyanate reaction to form a urethane structure as disclosed in *J. Polymer Science*, Polymer Chemistry Edition, Vol. 19, 381-388 (1981) John Wiley & Son, Inc.

The reactivity or catalyst kill problem can be overcome to a certain degree by using tertiary amines in place of primary or secondary amines. Both U.S. Pat. Nos. 3,726,952 and 4,098,731 describe this technique. Since isocyanates cannot react with tertiary amines the salt cannot be split; it thus remains neutral (the carboxylic acid is not free), hence, catalyst kill does not seem evident. The use of tertiary amines, however, often shows bleed out or exudation problems which in turn result in poor paint adhesion. Further, retention of physical properties is seldom possible because of either excess reactivity when using very catalytically active amines, or because of plasticizer effects brought about by excessively long tertiary amine molecules.

The technology of U.S. Pat. No. 4,111,861 states that polar metal compounds can be employed to overcome catalyst kill problems brought on by the presence of fatty carboxylic acids. It states that metal ions must be present in an amount sufficient to neutralize the acid. Reference is made to the use of the Bi, Pb, Na, Li, and K ion, with sodium carbonate, sodium oleate, and potassium laurate being exemplified. They also show sodium oleate alone to be an effective release agent. When evaluated in RIM polyol systems as a single additive, it failed to show adequate release characteristics in a screening program wherein hand mixed formulations were cast into an open mold.

Zinc stearate has long been known to be an effective release agent for most thermoplastics. It is also used in polyester sheet molding compounds. When evaluated in RIM polyol systems containing only hydroxyl groups as the active hydrogen-containing source, zinc stearate as a single additive failed to show adequate release characteristics in a screening program wherein hand mixed formulations were cast into an open mold. Zinc stearate was observed to dissolve in a mixture of oleoyl sarcosine and excess polyoxypropylene diamine of 400

MW and the resultant mixture performed as an effective mold release agent.

The present invention provides for an improvement in one or more of the following: (1) increased multiple release, (2) increased ease of release, (3) effective and very stable catalyst reactivity, and (4) minimally altered physical properties in molded parts.

SUMMARY OF THE INVENTION

One aspect of the present invention pertains to an internal mold release composition which comprises (A) at least one metal salt of an organic material derived from a material containing at least one carboxylic acid group, phosphorus-containing acid group or boron-containing acid group or mixture of such materials; wherein said metal is selected from Groups I, II, III-A, IV-B, V-B, VI-B, VII-B or VIII-B of the Periodic Table of the Elements, Sn, Pb, Sb or Bi and wherein said organic material contains a backbone of siloxane chains or contains at least one terminal or pendant saturated or unsaturated aliphatic hydrocarbon chain containing at least about 7 carbon atoms;

(B) a material containing at least one primary amine group and/or at least one secondary amine group per molecule or a mixture of such materials; and optionally (C) at lease one organic material containing at least one carboxylic acid group, phosphorus-containing acid group or boron-containing acid group or mixture of such materials wherein said organic material contains a backbone of siloxane chains or contains at least one terminal or pendant saturated or unsaturated aliphatic hydrocarbon chain containing at least about 7 carbon atoms.

Another aspect of the present invention pertains to an active hydrogen-containing composition comprising (I) at least one active hydrogen-containing material having a plurality of either one or a combination of any two or more groups selected from -OH, NH, -NH and -SH; and (II) an effective amount of internal mold release components to provide a composition comprising the aforementioned internal mold release composition.

Another aspect of the present invention pertains to a composition suitable for use as an internal mold release which composition comprises (A) a metal salt of either a carboxylic acid or an amido-containing carboxylic acid or a mixture of either or both wherein said metal is a member of Group 11 of the Periodic Table of Elements, aluminum, lithium, copper, iron, cobalt or nickel;

(B) a material containing at least one primary amine group and/or at least one secondary amine group per molecule or a mixture of such materials; and (C) either a carboxylic acid or an amido-containing carboxylic acid or a mixture of either or both; and wherein the components are employed in quantities such that (i) the equivalent ratio of (C):(B) is from about 0.04:1 to about 2:1, preferably from about 0.08:1 to about 1.5:1; and (ii) the weight ratio of (C):(A) is from about 0.3:1 to about 3:1, preferably from about 0.8:1 to about 1.2:1; with the proviso that at least either (1) at least one of the components (A) or (C) contains a terminal or pendant saturated or unsaturated aliphatic hydrocarbon chain having at least about seven carbon atoms attached to a carbonyl group or (2) component (B) contains a saturated or unsaturated aliphatic hydrocarbon group having at least about seven carbon atoms attached to a primary or secondary amine group.

Another aspect of the present invention pertains to an active hydrogen-containing composition comprising (I) at least one active hydrogen-containing material having a plurality of either one or a combination of any two or more groups selected from -OH, -NH, NH and -SH;

(II) an effective amount of an internal mold release composition which comprises (A) a metal salt of either a carboxylic acid or an amido-containing carboxylic acid or a mixture of either or both wherein said metal is a member of Group II of the Periodic Table of Elements, aluminum, lithium, copper, iron, cobalt or nickel:

(B) a material containing at least one primary amine group and/or at least one secondary amine group per molecule or a mixture of such materials; and (C) either a carboxylic acid or an amido-containing carboxylic acid or a mixture of either or both:

and wherein the components are employed in quantities such that (i) component (11-A) is employed in a quantity such that the weight ratio of (II-C):(II-A) is from about 0.3:1 to about 3:1, preferably from about 0.8:1 to about 1.2:1; and (ii) components (II-C) and (II-B) are employed in quantities which provide an equivalent ratio of (II-C):(II-B) of from about 0.04:1 to about 2:1, preferably from about 0.08:1 to about 1.5:1; with the proviso that at least either (a) at least one of the components (II-A) or (II-C) contains a terminal or pendant saturated or unsaturated aliphatic hydrocarbon chain having at least seven carbon atoms attached to a carbonyl group or (b) component (II-B) contains a saturated or unsaturated aliphatic hydrocarbon group containing at least about seven carbon atoms attached to a primary or secondary amine group.

Another aspect of the present invention pertains to an active hydrogen-containing composition which comprises (I)

(A) a relatively high equivalent weight active hydrogen-containing material containing a plurality of hydroxyl groups, thiol groups, primary amine groups, secondary amine groups or combination of such groups or a mixture of such active hydrogen-containing materials;

(B) at least one relatively low equivalent weight active hydrogen-containing material having a plurality of at least one member selected from -OH, -NH, NH or -SH groups or at least one each of any two or more of such groups: or (C) mixture thereof; and (II) an effective amount of an internal mold release composition which comprises (A) a metal salt of a carboxylic acid or an amido-containing carboxylic acid or a mixture of either or both wherein said metal is a member of Group II of the Periodic Table of Elements, aluminum, lithium, copper, iron, cobalt or nickel:

(B) a material containing at least one primary amine group and/or at least one secondary amine group per molecule or a mixture of such materials; and (C) a carboxylic acid, an amido-containing carboxylic acid or a mixture of either or both;

and wherein the components are employed in quantities such that (i) component (II-C) is employed in a quantity such that the weight ratio of (II-C):(II-A) is from about 0.3:1 to about 3:1, preferably from about 0.8:1 to about 1.2:1; and (ii) components (II-C) and (II-B) are employed in quantities which provide an equivalent ratio of (II-C):(II-B) of from about 0.04:1 to about 2:1, preferably from about 0.08:1 to about 1.5:1; with the proviso that at least either (a) at least one of the components (11-A) or (II-C) contains a saturated or unsaturated aliphatic hydrocarbon chain having at least seven carbon atoms attached to a carbonyl group or (b) component (II-B) contains a saturated or unsaturated aliphatic hydrocarbon group containing at least about seven carbon atoms attached to a primary or secondary amine group.

Another aspect of the present invention pertains to a composition suitable for use as an internal mold release system which composition comprises (A) at least one organic material containing at least one carboxylic acid group, boron-containing acid group, or phosphorus-containing acid group and which contains a backbone consisting of saturated or unsaturated aliphatic hydrocarbon chains or siloxane chains wherein said acid groups have been at least partially but may be completely reacted, complexed or associated with a metal from group II of the Periodic Table of the Elements, aluminum, lithium, copper, iron, cobalt or nickel; and (B) at least a sufficient quantity of a material containing at least one primary amine group and/or at least one secondary amine group per molecule or a mixture of such materials so as to solubilize at least about 0.1 percent by weight of component (A) in any liquid composition in which said mold release system is employed:

and wherein at least one of components (A) and (B) contains at least one lipophilic group.

Another aspect of the present invention pertains to an active hydrogen-containing composition comprising (A) at least one active hydrogen-containing material having a plurality of either one or a combination of any two or more groups selected from -OH, -NH, NH and -SH; and (B) at least one organic material containing at least one carboxylic acid group, boron-containing acid group or phosphorus-containing acid group and which contains a backbone consisting of saturated or unsaturated aliphatic hydrocarbon chains or siloxane chains wherein said acid groups have been at least partially but may be completely reacted, complexed or associated with a metal from group 11 of the Periodic Table of the Elements, aluminum, lithium, copper, iron, cobalt or nickel; and if component (A) contains an insufficient quantity of a material containing primary or secondary amine groups, then the composition also contains (C) at least a sufficient quantity of a material containing at least one primary amine group and/or at least one secondary amine group per molecule or a mixture of such materials so as to solubilize at least about 0.1 percent by weight of component (B) in said active hydrogen-containing composition and wherein at least one of components (B) or (C) contains at least one lipophilic group.

Another aspect of the present invention pertains to an active hydrogen-containing composition which comprises:

(A) a relatively high equivalent weight active hydrogen-containing material terminated in hydroxyl, primary amine, secondary amine or thiol groups or a combination of such groups or a mixture of such active hydrogen-containing materials:

(B) at least one relatively low equivalent weight active hydrogen-containing material having a plurality of either one or a combination of any two or more groups selected from -OH, -SH, NH and -NH groups;

(C) at least one material containing at least one carboxylic acid group, boron-containing acid group or phosphorus-containing acid group and which contains a backbone consisting of saturated or unsaturated aliphatic hydrocarbon chains or siloxane chains wherein said acid groups have been at least partially but may be completely reacted, complexed or associated with a metal from group II of the Periodic Table of the Elements, aluminum, lithium, copper, iron, cobalt or nickel: and if either of components (A) or (B) either individually or collectively contain an insufficient quantity of a material containing primary and/or secondary amine groups, then the composition also contains (D) at least a sufficient quantity of a material containing at least one primary amine group and/or at least one secondary amine group per molecule or a mixture of such materials so as to solubilize at least 0.1 percent by weight of component (C) in said active hydrogen-containing composition and wherein at least one of components (C) and (D) contains at least one lipophilic group.

Another aspect of the present invention pertains to an active hydrogen-containing composition comprising:

(A) at least one active hydrogen-containing material having a plurality of either one or a combination of any two or more groups selected from -OH, -NH, NH and -SH; and (B) an effective amount, of an internal mold release composition which comprises:

(1) at least one metal salt of a carboxylic acid wherein there is a saturated or unsaturated hydrocarbon chain having at least about 7 carbon atoms attached to the carbonyl group of said acid and wherein said metal is selected from Group II of the Periodic Table of the elements; and if component (A) contains an insufficient quantity of primary or secondary amine groups, then component (B) also contains (2) at least one material containing at least one primary amine group and/or at least one secondary amine group per molecule or a mixture of such materials; and wherein (i) the weight ratio of component (B-1) to the combined weight of components (A) and (B-2) is from about 0.001:1 to about 0.15:1, preferably from about 0.002:1 to about 0.1:1, most preferably from about 0.004:1 to about 0.05:1;

(ii) the weight ratio of all compounds containing primary and/or secondary amine groups to the combined weight of components (A) and (B-2) is from about 0.002:1 to about 1:1, preferably from about 0.003:1 to about 0.5:1, most preferably from about 0.06:1 to about 0.22:1; and (iii) component (B-1) is soluble in said composition to the extent of at least about 0.1, preferably from about 0.5 to about 6, percent by weight of said active hydrogen-containing composition.

Another aspect of the present invention pertains to an active hydrogen-containing composition which comprises:

(I)
(A) at least one relatively high equivalent weight active hydrogen-containing material terminated in hydroxyl, primary amine, secondary amine or thiol groups or a combination of such groups or a mixture of such active hydrogen-containing materials:

(B) at least one relatively low equivalent weight active hydrogen-containing material having a plurality of either one or a combination of any two or more groups selected from -OH, -SH, NH and -NH groups: or (C) mixture thereof: and (II)an effective amount of an internal mold release composition which is substantially soluble in said active hydrogen-containing composition which comprises:

(A) at least one metal salt of a carboxylic acid wherein there is a saturated or unsaturated hydrocarbon chain having at least about 7, carbon atoms attached to the carbonyl group of said acid and wherein said metal is selected from Group II of the Periodic Table of the elements; and if component (A) contains an insufficient quantity of primary or secondary amine groups, then (B) at least one material containing at least one primary amine group and/or at least one secondary amine group per molecule or a mixture of such materials:
and wherein (i) the weight ratio of component (II-A) to the combined weight of components (I) and (II-B) is from about 0.001:1 to about 0.15:1, preferably from about 0.002:1 to about 0.1:1, most preferably from about 0.004:1 to about 0.05:1;

(ii) the weight ratio of all compounds containing primary and/or secondary amine groups to the combined weight of components (I) and (II-B) is from about 0.002:1 to about 1:1, preferably from about 0.002:1 to about 1:1, preferably from about 0.06:1 to about 0.22:1: and (iii) component (11-A) is soluble in said composition to the extent of at least about 0.1 percent by weight of the combined weight of components (I) and (II-B).

Another aspect of the present invention pertains to an improvement in a process for preparing polymeric products which process comprises mixing and injecting into a suitable mold a polyisocyanate and/or polyisothiocyanate "A-side" component and an active hydrogen-containing "B-side" component wherein the improvement comprises employing as the "B-side" component, any of the aforementioned active hydrogen-containing compositions.

The term polymer as employed herein means those polymers containing urethane and/or urea groups.

The term effective amount of an internal mold release as employed herein means that quantity which will permit a molded part prepared from reaction of the active hydrogen-containing composition with a composition containing a plurality of -NCO and/or -NCS groups to be easily removed from its mold.

The term total hydrogen equivalent weight as employed herein means the molecular weight divided by the total number of hydrogen atoms in the molecule which are connected to nitrogen, oxygen and sulfur atoms.

The term equivalent ratio as it pertains to the ratio of the acid salt component and the amine component means the ratio of the number of

equivalents contained in the acid salt component to the number of amine nitrogen equivalents contained in the amine component.

By the term lipophilic as employed herein it is meant that the material contains at least one member of the group consisting of R-CH wherein R is a saturated or unsaturated aliphatic hydrocarbon group having at least 6 carbon atoms.

Any reference herein to the Periodic Table of the Elements refers to that published by Sargent-Welch Scientific Company as catalog number S-18806, 1968.

DETAILED DESCRIPTION OF THE INVENTION

Suitable carboxylic acids which can be employed herein as a component in the internal mold release composition include any saturated or unsaturated aliphatic or cycloaliphatic carboxylic acid or aromatic carboxylic acid, preferably those carboxylic acids having from about 2 to about 30, preferably from about 2 to about 18, carbon atoms.

Also suitable as carboxylic acids are those represented by the formula

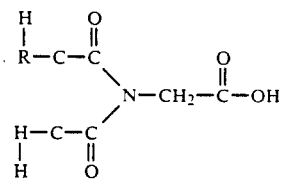

wherein R is a hydrocarbyl group having from 1 to about 12 carbon atoms.

Particularly suitable carboxylic acids include, for example, oleic acid, lauric acid, palmitic acid, stearic acid, mixtures thereof and the like.

Suitable carboxylic acids include amido-containing carboxylic acids such as the reaction products of carboxylic acid halides containing from about 1 to about 30, preferably from about 2 to about 18, most preferably from about 5 to about 18, carbon atoms with an amino carboxylic acid having from about 2 to about 4, preferably from about 2 to about 3, carbon atoms per molecule.

Particularly suitable carboxylic acids include amido-containing carboxylic acids such as those represented by the general formula

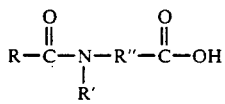

wherein R is a hydrocarbon or substituted hydrocarbon group having from 1 to about 29, preferably from about 2 to about 17, carbon atoms; R' is hydrogen, an alkyl or hydroxyl substituted alkyl group having from 1 to about 3 carbon atoms and R" is a divalent hydrocarbon group having from 1 to about 3, preferably 1, carbon atoms, such as, for example, oleoyl sarcosine, lauryl sarcosine, capryl sarcosine, oleoyl glycine, octanol glycine, oleoyl hydroxyethyl glycine, mixtures thereof and the like. These amido carboxylic acids can be prepared by the Schotten-Baumann acylation reaction wherein an acyl halide is reacted with an amino acid.

Suitable materials containing at least one carboxylic acid group and containing siloxane chains include those described by J. W. Keil in U.S. Pat. No. 4,076,695 which is incorporated herein by reference. These include carboxy functional siloxanes consisting essentially of from 0.5 to 20 mole percent of $R_aR'_bSiO_{4a-b/2}$ units and from 80 to 99.5 mole percent of $R''_cSiO_{4-c/2}$ units wherein R is a carboxy functional radical, a has an average value from 1 to 3, R' is a hydrocarbon or substituted hydrocarbon radical, b has an average value from 0 to 2, the sum of a+b is from 1 to 3, R" is a hydrocarbon or substituted hydrocarbon radical, and c has an average value from 0 to 3.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, mixtures thereof and the like.

Suitable organic materials containing at least one boron-containing acid group include, for example, dioctadecyl ester of boric acid, monododecyl mono(phenylmethyl) ester of boric acid, monododecyl monophenyl ester of boric acid, monoheptadecyl mono(phenylmethyl) ester of boric acid, monodecyl ester of boric acid, mixtures thereof and the like.

Suitable amines which can be employed herein as a component in the internal mold release composition include any aliphatic, cycloaliphatic, or aromatic compound containing at least one primary or secondary amine group with those compounds having at least two primary and/or secondary amine groups being especially preferred.

Suitable amine compounds include, for example, oleyl amine, coco amine, talloil amine, ethanolamine, diethyltriamine, ethylenediamine, propanolamine, aniline, mixtures thereof and the like.

Particularly suitable as the amine component in the internal mold release composition are these aliphatic amines enumerated later on as being low equivalent weight amine-containing active hydrogen-containing materials, and aromatic amines of relatively low molecular weight active hydrogen-containing materials also enumerated later on. Examples of such particularly suitable amines include the compounds of aminated polyoxyalkane glycols, hexamethylene diamine, diethylenetriamine, and hydrocarbyl substituted aromatic amines such as, for example, diethylenetoluenediamine.

Suitable carboxylic acid or amido carboxylic acid salts of metals which can be employed herein as a component in the internal mold release composition include those containing the metal ions from group II metals, lithium, copper, aluminum, iron, cobalt, and nickel. The organic portions of these compounds are suitably saturated or unsaturated having from about 2 to about 30, preferably from about 2 to about 21 carbon atoms. Particularly suitable metal salts of carboxylic acids or amido carboxylic acids include, for example, zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate or mixtures thereof and the like.

Suitable carboxylic acid salts containing siloxane chains herein include the Group II, aluminum, lithium, copper, iron, cobalt or nickel salts of the acids described in the aforementioned U.S. Pat. No. 4,076,695.

The partially or totally reacted, complexed or associated acid or amido acids with the metals of Group II of the Periodic Table of the elements, aluminum, lithium, copper, iron, cobalt or nickel can be prepared by reacting such acids or amido acids with the appropriate quantity of a compound containing the metal such as a hydroxide or if the metal is above hydrogen in the electromotive series, it can be reacted directly with the acid or acid amide.

Also, mixtures of the acids and metal salts of the acids which are available commercially can be employed when partially reacted, complexed or associated materials are desired. Likewise commercially available metal salts of the acids or amido acids can be employed when the totally reacted, complexed or associated materials are desired.

For purposes of the present invention, the total hydrogen equivalent weight is determined by dividing the molecular weight by all of the hydrogen atoms contained in any material derived from -OH, -NH and NH and -SH groups, regardless of whether or not the group reacts with an NCO or NCS group when preparing molded articles.

In some instances the quality of the metal salt of a carboxylic acid or metal salt of an amido-containing carboxylic acid may affect the performance of the internal mold release composition. This is believed to be particularly true with the use of zinc stearate in urethane reaction injection molding systems.

Suitable materials which can be employed herein as relatively high equivalent weight hydroxyl-, primary amine- or secondary amine-containing materials include, for example, those hydroxyl and/or amine materials having an average hydrogen functionality of from 2 to about 8, preferably from 2 to 4 and an average total hydrogen equivalent weight of from about 500 to about 5000, preferably from about 1000 to about 3000.

Suitable relatively high equivalent weight hydroxyl-containing polyols which can be employed herein include, for example, those polyether and polyester polyols which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500, including mixtures thereof.

Suitable relatively high equivalent weight polyether polyols which can be employed herein include those which are prepared by reacting an alkylene oxide, halogen substituted or aromatic substituted alkylene oxides or mixtures thereof with an active hydrogen-containing initiator compound.

Suitable such oxides include, for example, tetrahydrofuran, ethylene oxide, propylene oxide, 1,2 -butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high equivalent weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5 -diamine, triphenylmethane-4,4',4"-triamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenylpolymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g., with halogen atom) and/or unsaturated. Examples of carboxylic acids of this kind include succinic acid: adipic acid; suberic acid; azelaic acid: sebacic acid; phthalic acid; isophthalic acid; trimellitic acid: phthalic acid anhydride: tetrahydrophthalic acid anhydride: hexahydrophthalic acid anhydride: tetrachlorophthalic acid anhydride: endomethylene tetrahydrophthalic acid anhydride: glutaric acid anhydride; maleic acid: maleic acid anhydride; fumaric acid; dimeric and trimeric fatty acids; such as oleic acid, which may be in admixture with monomeric fatty acids, terephthalic acid dimethyl ester; terephthalic acid bis-glycol ester and the like. Mixtures of such acids or anhydrides may also be employed.

Examples of suitable polyhydric alcohols include ethylene glycol, 1,2-propylene glycol; 1,3 -propylene glycol: 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol: glycerol: trimethylol propane; 1,2,6-hexane triol: 1,2,4-butane triol; trimethylol ethane: pentaerythritol: quinitol: mannitol: sorbitol; methyl glycoside: diethylene glycol; triethylene glycol; tetraethylene glycol; polyethylene glycol; dipropylene glycol: polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other suitable relatively high equivalent weight polyols which can be employed herein include polymer-containing polyols such as, for example, those disclosed in U.S. Pat. Nos. RE 29,118 (Stamberger), RE 28,715 (Stamberger), RE 29,014 (Pizzini et al.) and 3,869,413 (Blankenship et al.), Hoffman in U.S. Pat. No. 4,394,491 and Hoffman et al. in U.S. Pat. No. 4,390,645 all of which are incorporated herein by reference.

Also suitable as the relatively high equivalent weight polyols are the thiol derivatives of the aforementioned polyols such that all or a portion of the hydroxyl or amine groups are replaced with -SH groups.

Suitable materials which can be employed herein as relatively low equivalent weight active hydrogen-containing materials include one or more of any such materials containing either hydroxyl groups, primary amine groups, secondary amine groups or mixtures of such groups; such materials having an average active hydrogen functionality of from about 2 to about 16, preferably from about 2 to about 8 and an average active hydrogen equivalent weight of from about 15 to about 500, preferably from about 32 to about 200 and when the active hydrogen atoms are derived only from OH groups then the maximum equivalent weight is about 200.

Also suitable relatively high equivalent weight active hydrogen-containing materials are the products resulting from aminating the polyether and polyester polyols described above.

Suitable relatively low equivalent weight polyols which can be employed herein include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylenediamine, diethylenetriamine, mixtures thereof and the like.

Suitable relatively low equivalent weight amine-containing active hydrogen-containing materials which can be employed herein include, for example, ethylenediamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like.

Also suitable relatively low equivalent weight active hydrogen-containing materials are the aminated polyoxyalkylene glycols having an average amino hydrogen equivalent weight of from about 60 to about 110.

Suitable also as the relatively low equivalent weight active hydrogen-containing materials are the thiol derivatives of the aforementioned materials wherein at least one of the hydroxyl or amine groups has been replaced with an -SH group.

The term aliphatic amine as employed herein includes also the cycloaliphatic amines and heterocyclic aliphatic amines so long as they contain at least one primary or secondary amine group.

Suitable aromatic amines which can be employed herein as a relatively low molecular weight active hydrogen-containing material include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4''-triamine, 4,4'-di(methylamino)diphenylmethane, 1-methyl-2-methylamino-4-aminobenzene, polyphenylpolymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropylaniline), mixtures thereof and the like.

Suitable polyisocyanates include the organic aromatic polyisocyanates, aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable as organic aromatic and/or aliphatic polyisocyanates are the prepolymers prepared from such polyisocyanates and compounds having 2 or more active hydrogen atoms; as well as such polyisocyanates and/or prepolymers thereof which have been modified to contain uretonimine or carbodiimide linkages.

Suitable organic aliphatic polyisocyanates include, in addition to the hydrogenated derivatives of the abovementioned organic aromatic polyisocyanates, 1,6-hexamethylenediisocyanate, isophoronediisocyanate, 1,4-cyclohexyldiisocyanate, 1,4-bis-isocyanatomethylcyclohexane, mixtures thereof and the like.

Also suitable are the corresponding polyisothiocyanates.

Preferably, the cross-linker or chain extender component employed herein is a combination comprising
(1) at least one member selected from the group consisting of
  (a) hydroxyl-containing materials which are essentially free of aliphatic amine hydrogen atoms, have an average OH functionality of from about 2 to 4 and have an average OH equivalent weight of from about 30 to about 120 and
  (b) aromatic amine-containing materials which are essentially free of aliphatic amine hydrogen atoms and which contain at least two aromatic amine hydrogen atoms: and (2) at least one aliphatic amine-containing material having at least one primary amine group, an average aliphatic amine hydrogen functionality of from about 2 to about 16 and an average aliphatic amine hydrogen equivalent weight of from about 15 to about 500.

Most preferably, the cross-linker or chain extender component is a combination comprising components (1-b) and (2) such as, for example, a combination of an aminated polyoxypropylene glycol having an average molecular weight of about 400 and diethyltoluenediamine.

The polymers can be prepared either in the presence or absence of a catalyst. Those polymers prepared from amine-containing polyols do not usually require a catalyst although catalysts can be employed if desired. On the other hand, those polymers prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis-(2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol or they may be dissolved or dispersed in one of the components.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

If desired, the polyurethanes can be modified so as to contain isocyanurate or thioisocyanurate groups by employing relatively high NCO or NCS to active hydrogen ratios, e.g., greater than about 1.5:1, preferably greater than about 2:1, and employing a trimerization catalyst. Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like as disclosed in U.S. Pat. No. 4,126,741 (Carleton et al.) all of which are incorporated herein by reference.

The zwitterions can also function as a catalyst for urethane formation, i.e., the NCX-OH reaction.

If desired, the densities of the polymers produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane or other polymer-forming components. Suitable such inert gases include, for example, nitrogen, oxygen, carbon dioxide, xenon, helium, mixtures thereof such as air and the like.

If desired, cell control agents can be employed, particularly when preparing foams or microcellular products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; L-520, L-5320 and L-5340 commercially available from Union Carbide Corp.; and B-1048 commercially available from PH. Goldschmidt, AG, mixtures thereof and the like.

The polyurethanes and other polymeric products may additionally contain, if desired, coloring agents, fire-retardant agents, fillers, modifiers and the like.

Suitable liquid and solid modifiers include those disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) and ¼ inch (0.64 cm) and the like. Other particularly suitable fillers are mica, wollastonite, and the like.

The components which react to form the polymeric products can be shaped or formed into useful articles by injecting the reactive mixture into molds which are capable of withstanding the exotherm of the polymerizing mass and are non-reactive with and are insoluble when in contact with the liquid reactive mixture: Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for RIM applications include those disclosed in a paper entitled "THE BAYFLEX 110 SERIES—THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Mich., Sept. 26-30, 1977; a paper entitled "THE PROPERTIES OF HIGH MODULUS RIM URETHANES", by R. M. Gerkin and F. E. Critchfield presented at the above meeting: British Patent No. 1,534,258 titled "PROCESS FOR THE PRODUCTION OF ELASTOMERIC POLYURETHANE-POLYUREA MOULDED PRODUCTS HAVING A COMPACT SURFACE SKIN" and a book by F. Melvin Sweeney entitled INTRODUCTION TO REACTION INJECTION MOLDING, Technomics, Inc., 1979.

When injecting a relatively rapid-setting blend into massive metal molds, it may be necessary in order for the molded article to have good surface characteristics to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

We claim:

1. A process for preparing polymeric products which process comprises mixing and injecting into a suitable mold an "A-side" component comprising a polyisocyanate and/or polyisothiocyanate and a "B-side" component comprising at least one material containing at least one primary and/or secondary amine group per molecule or a mixture of such materials, and a metal salt of a carboxy functional siloxane consisting essentially of from 0.5 to 20 mole percent of $R_aR'_bSiO_{4-a-b/2}$ units and from 80 to 99.5 mole percent of $R''_cSiO_{4-c/2}$ units wherein R is a carboxy functional radical, a has an average value from 1 to 3, R' is a hydrocarbon or substituted hydrocarbon radical, b has an average value from 0 to 2, the sum of a+b is from 1 to 3, R'' is a hydrocarbon or substituted hydrocarbon radical, and c has an average value from 0 to 3, wherein said metal is selected from Groups II-A or II-B of the Periodic Table of the Elements, aluminum, lithium, copper, iron cobalt or nickel.

2. The process of claim 1 wherein said "B-side" contains at least one material having hydroxyl, primary amine or secondary amine groups, an average active hydrogen functionality of from 2 to about 8 and an average total active hydrogen equivalent weight of from about 500 to about 5000.

3. The process of claim 2 wherein said "B-side" contains a polyether polyol having an average hydroxyl functionality of from about 2 to about 4 and an average hydroxyl equivalent weight of from about 1000 to about 3000.

4. The process of claim 3 wherein said metal salt is present in an amount from about 0.5 to about 6 weight percent of said "B-side" component.

5. The process of claim 4 wherein said material containing at least one primary and/or secondary amine groups per molecule is a product resulting from aminating a material prepared by reacting an initiator compound having from 2 to about 4 reactive hydrogen atoms with propylene oxide, a combination thereof in any order or a mixture thereof, said product having an average molecular weight of from about 200 to about 6000, an aromatic amine or mixture thereof.

6. The process of claim 5 wherein said metal is zinc, and said material containing at least one primary and/or secondary amine group per molecule is a mixture of diethyltoluenediamine and a product resulting from aminating a material prepared by reacting an initiator compound having from 2 to about 4 reactive hydrogen atoms with propylene oxide.

7. The process of claim 6 wherein the "B-side" component further comprises at least one material containing at least one carboxylic acid group, phosphorus-containing acid group or boron-containing acid group or mixture thereof.

8. The process of claim 2 wherein the "B-side" component further comprises at least one material containing at least one carboxylic acid group, phosphorus-containing acid group or boron-containing acid group or mixture thereof.

* * * * *